United States Patent [19]
Ivanko et al.

[11] 4,177,693
[45] Dec. 11, 1979

[54] DRIVE SYSTEM

[75] Inventors: Theodore Ivanko, Fairfield; Michael S. Saboe, Trumbull, both of Conn.

[73] Assignee: Avco Corporation, Stratford, Conn.

[21] Appl. No.: 917,981

[22] Filed: Jun. 22, 1978

[51] Int. Cl.² .............................................. F16H 1/28
[52] U.S. Cl. ................... 74/661; 74/606 R; 74/665 A
[58] Field of Search ............... 74/661, 665 A, 665 B, 74/606 R

[56] References Cited

U.S. PATENT DOCUMENTS

| | | | |
|---|---|---|---|
| 2,180,599 | 11/1939 | Menasco | 74/661 X |
| 2,971,402 | 2/1961 | Louercheck | 74/661 |
| 3,100,378 | 8/1963 | Austin et al. | 74/661 X |
| 3,455,182 | 7/1959 | Kelley | 74/661 |
| 3,564,937 | 2/1971 | Soloview et al. | 74/665 A |
| 3,602,068 | 8/1971 | White | 74/661 X |
| 3,782,223 | 1/1974 | Watson et al. | 74/661 X |

*Primary Examiner*—Ronald Feidbaum
*Attorney, Agent, or Firm*—Ralph D. Gelling

[57] ABSTRACT

A combining reduction and accessory gear box receiving power input from a multiple of gas turbine engines includes provisions for providing separate accessory drives for each engine used therewith, and an output drive that is driven by any number or all of the engines. Each gas turbine engine, as well as the gears associated therewith and its connection to the output drive, is totally independent of the other engines.

10 Claims, 6 Drawing Figures

DRIVE SYSTEM

BACKGROUND OF THE INVENTION

Heretofore it has been the desire of those skilled in the art to use a plurality of engines to drive a simple reduction gear box that was capable of delivering power to means to be driven. In such devices the object was to use the engine to mount and drive accessory devices. In most such prior art structures there was no desire to segregate internal portions of such gear box such that the engine input of one could not, if damaged, contaminate the other. There has been various provisions in such prior art structures to remotely locate the engines due to certain requirements, as with turbine type powerplants to prevent shrapenal of any disintegrating powerplant from affecting any other or for that matter any engine fire of one from spreading to the other. It is in the improvement of such drive systems that the disclosure of this invention hereinafter will be found beneficial to those skilled in the art.

SUMMARY OF THE INVENTION

The present invention provides a unitary gear box operative in association with a plurality of engines. The gear box is connected to the respective outputs of the engines and converts same to drive a plurality of separate accessory drives for the engines, as well as a common main output drive shaft means for all of the engines. More particularly, the gear box is disposed in a housing having three main sections including a center case, a rear cover and a front cover. The center case is joined to the rear cover to thereby provide separate compartments for segregating the outputs of the engines. Furthermore, the center case cooperates with the front cover to provide an additional compartment for the segregated operation of the common main drive shaft means. In the application where the subject system is employed in a helicopter, the common main drive shaft means includes a primary drive shaft for the rotor, and a secondary drive shaft for the tail rotor. The unitary gear box has idler gears operatively connecting the individual drive means of each engine to the common main drive shaft. Also enclosed in the segregated compartment for the main drive are gears to drive an oil pump for the independent oil system for the main drive, whereby any contamination of the oil in the other compartments associated with each engine will not be accessible to the additional compartment provided for the main drive.

Accordingly there is provided a new and improved multipackaccessory and output drive gear box which can accommodate the power output of a plurality of gas turbine engines, with each engine having its own accessories, overrunning clutch and lubrication system so as to be totally independent of the other engines, yet the gearbox provides a single main output drive.

Further objects and advantages of the subject invention will become apparent from a reading of the following detailed description taken in conjunction with the accompanying drawings.

DRAWING DESCRIPTION

DETAILED DESCRIPTION

Figure 1:
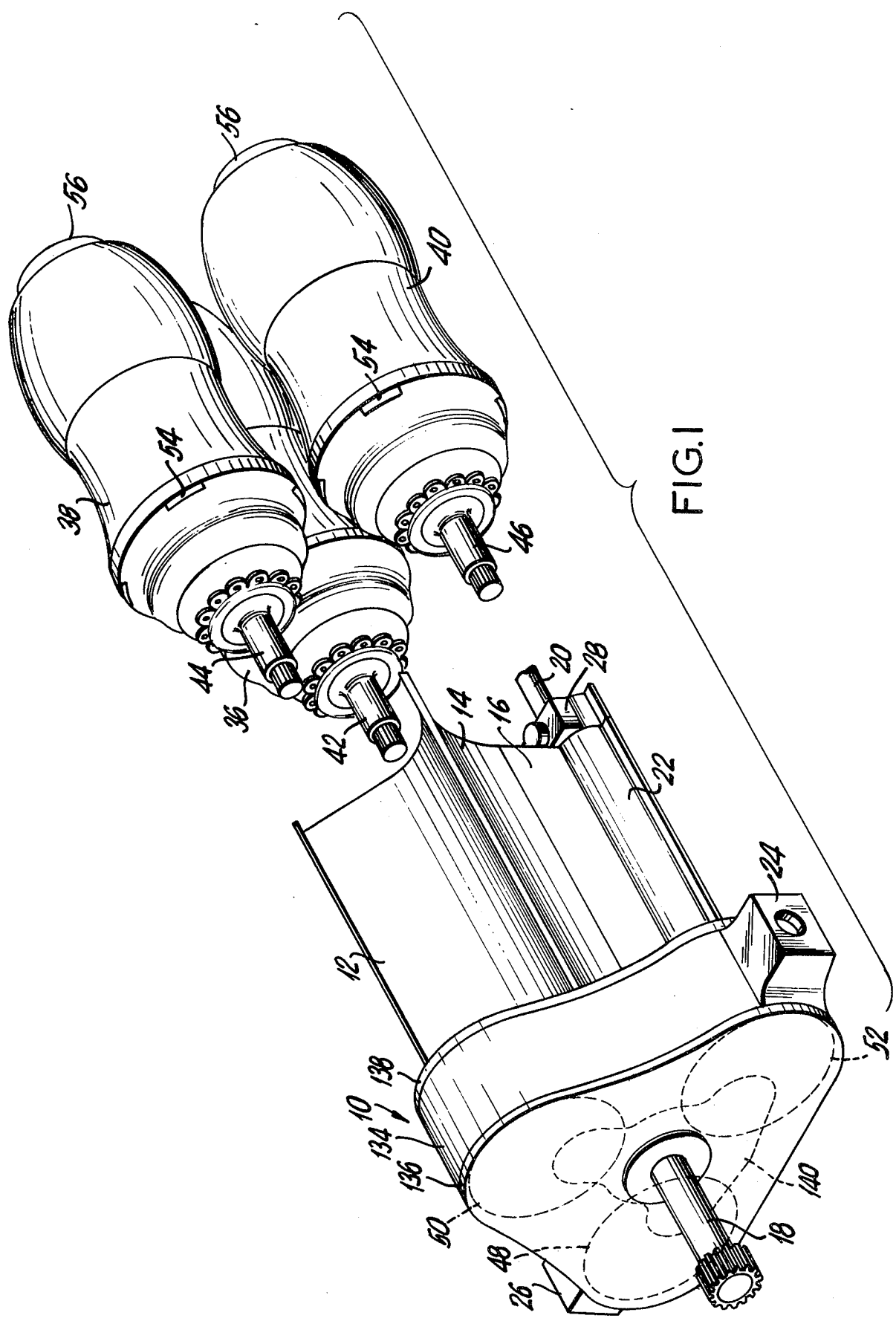
FIG. 1 is an exploded isometric of the drive system of this invention.

With specific reference now to FIG. 1 the drive system of the subject invention is shown to comprise a gear box 10 mounting a firewall structure having plates 12, 14 and 16 joined as a "y" structure. The gear box 10 has a primary power shaft 18 extending forwardly therefrom and a secondary power shaft 20 extending rearwardly from the tunnel-like structure 22 disposed in the plate 16. Mounting attachments 24, 26 and 28 are provided on the gear box and its firewall structure to adapt it to a vehicle, such as the helicopter 30 illustrated in FIG. 2, so that the gear box 10 may drive lifting rotor 32 and tail rotor 34.

Figure 2:
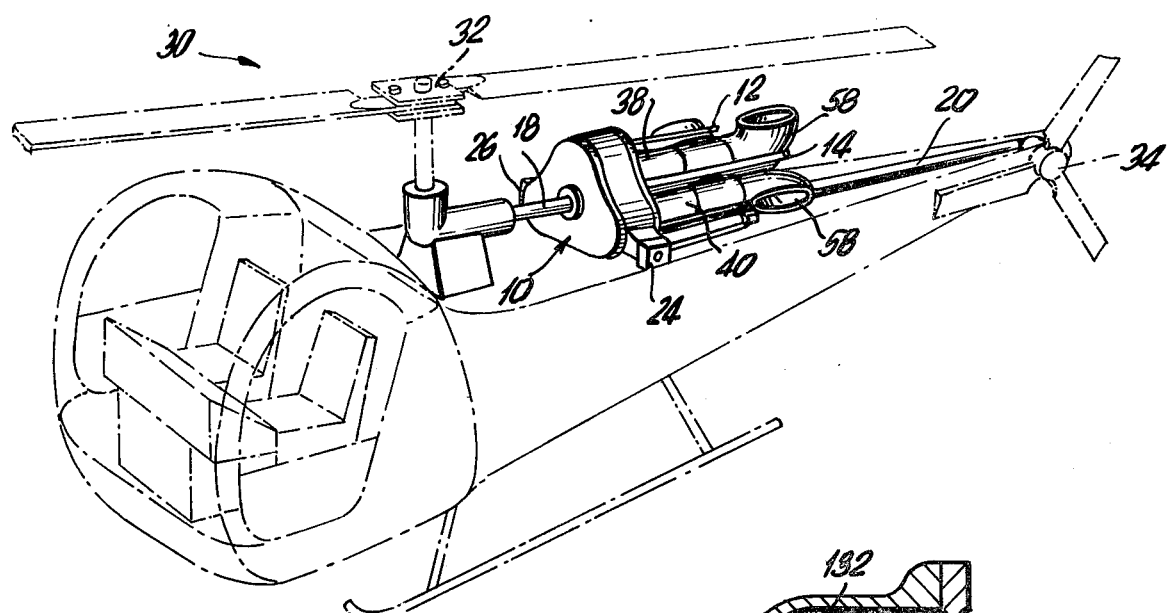
FIG. 2 is a view of the drive system of FIG. 1 as applied to a helicopter.

As seen in FIG. 1 the gear box has a rear face provisional as will appear hereinafter to mount three turboshaft engines 36, 38 and 40. The drive shafts 42, 44 and 46 of engines 36, 38 and 40, respectively, are received internally of the gear box 10 for independently driving same. Furthermore, gear box 10 includes three sets of accessory drive areas 48, 50 and 52, the constructions of which are identical, with the area 50 being more particularly illustrated in FIG. 6. The turboshaft engines 36, 38 and 40 are provided with air inlet means 54 and turbine exhaust means 56. Ducting 58, as seen in FIG. 2, may be added to direct the exhaust gases away from the drive system.

Figure 3:
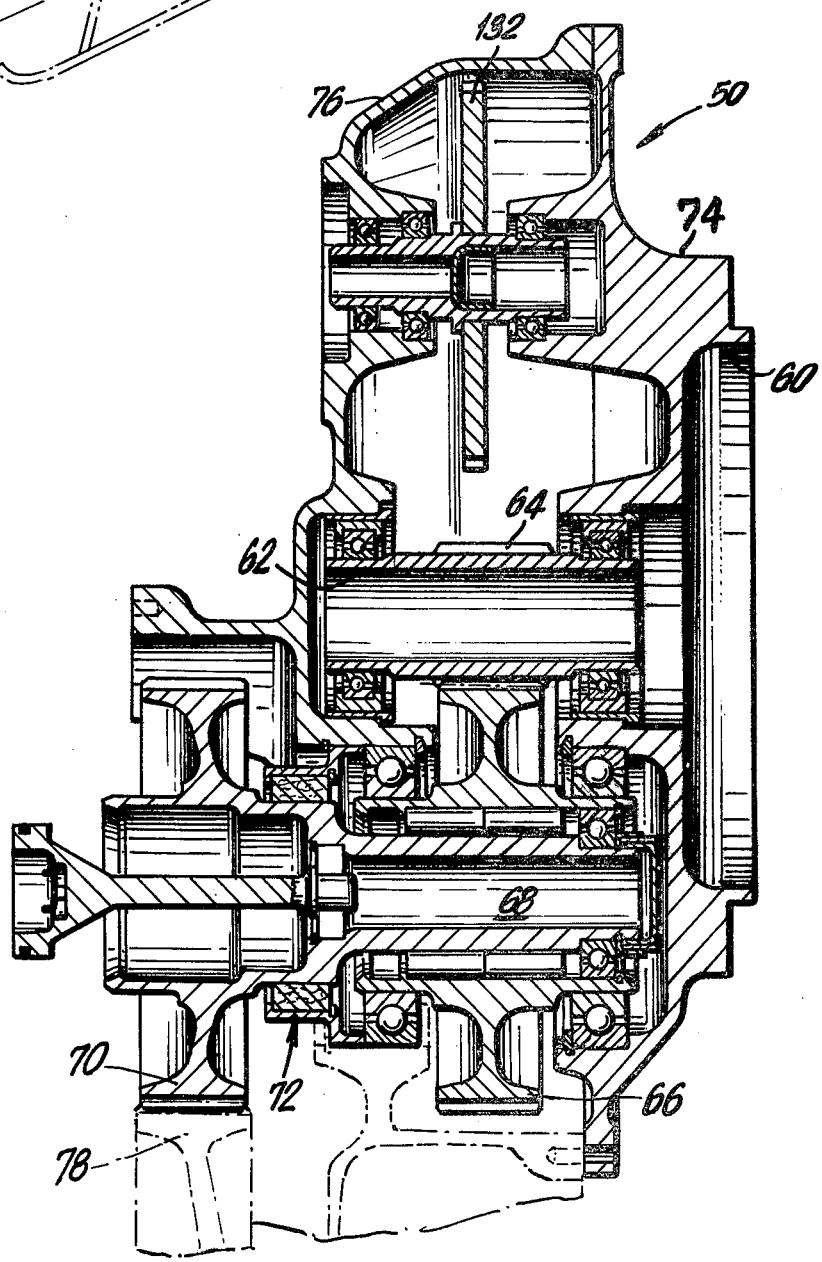
FIG. 3 is a cross sectional side view of a portion of the gear box.
Figure 4:
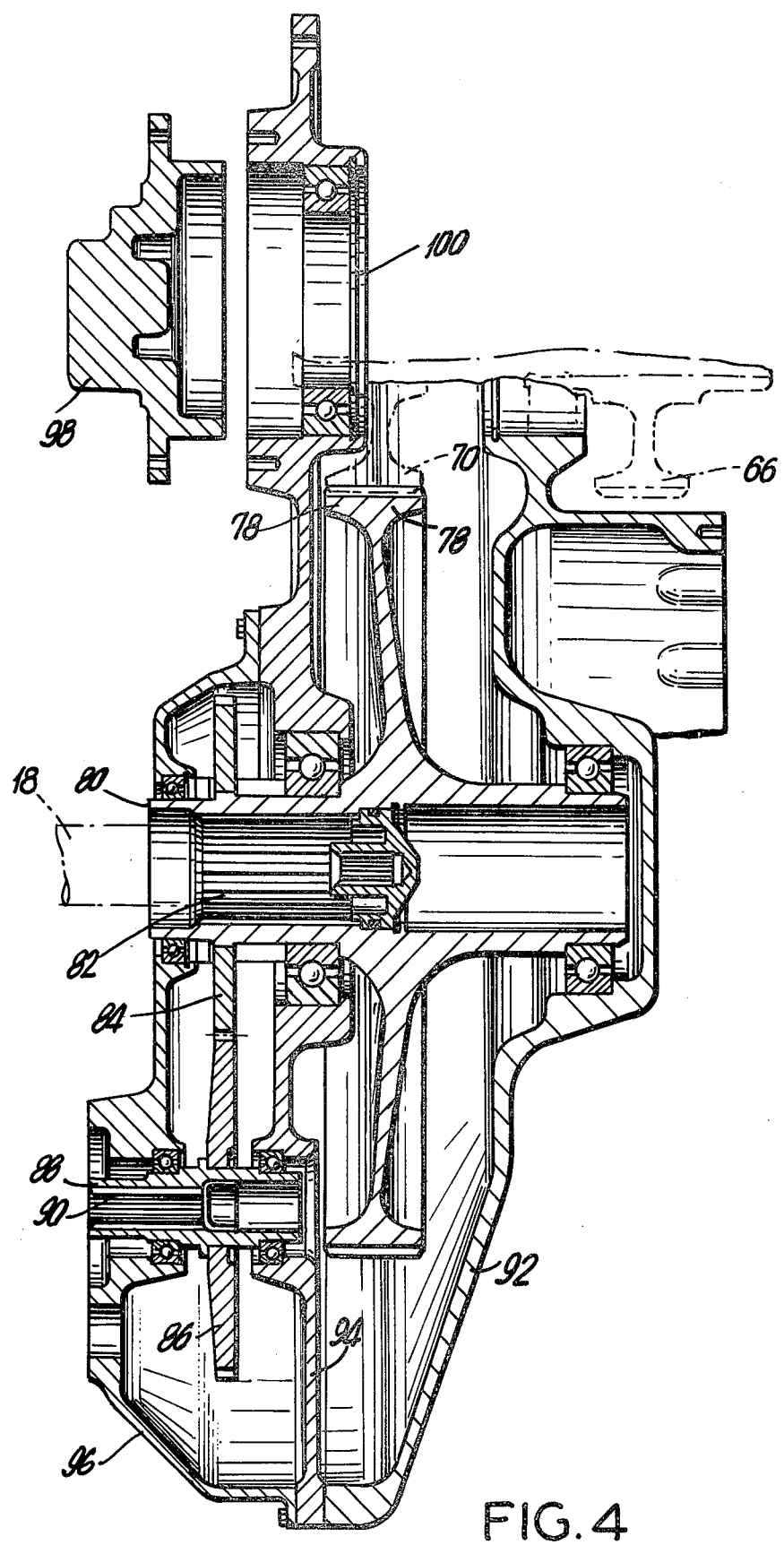
FIG. 4 is a cross sectional side view of another portion of the gear box that mates with the portion of FIG. 3.

FIG. 3 is a sectional view through the upper (central) engine part 60, and illustrates a shaft end 62 to be driven by shaft 44. Spline surface 64 is adapted to mate with gear 66 that is the drive for an overrunning clutch connection 68 for idler gear 70. Seal means 72 closes the engine drive compartment 50 comprising housing sections 74 and 76 from other compartments. Compartment 50 is related to the output compartment shown by FIG. 4 to which it is joined so that idler 70 drives output gear 78 on shaft 80 splined as at 82 to receive the main output drive shaft 18. A gear 84 is also driven by shaft 80 to drive gear 86 connected to a shaft 88 splined as at 90 to receive an oil pump drive (not shown). This compartment is enclosed by housings 92, 94 and 96, with a torque meter cover 98 for the access 100 to the top engine overrunning clutch mechanism.

Figure 5:
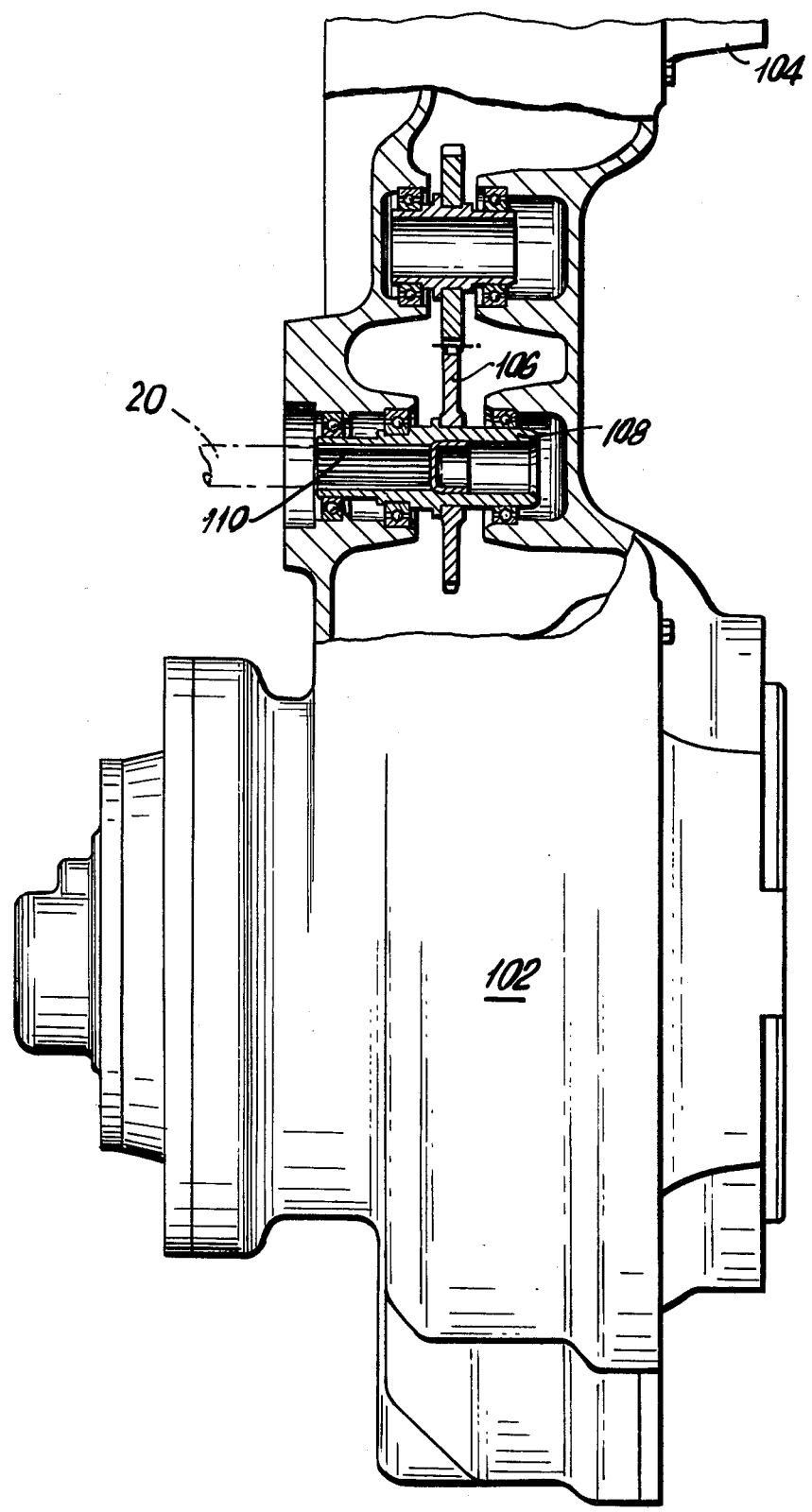
FIG. 5 is a plan broken view of the gear box through a lower portion of the gear box above the lower engine mounts.

In the broken cross section plan view across the housing above the lower two engine attachments as shown in FIG. 5, one 102 shown in full and the other 104 in partial, the housing front and rear covers are cut away to show a gear 106 for a hollow shaft 108 having splines 110 to adapt the secondary drive shaft 20 to the power train.

Figure 6:
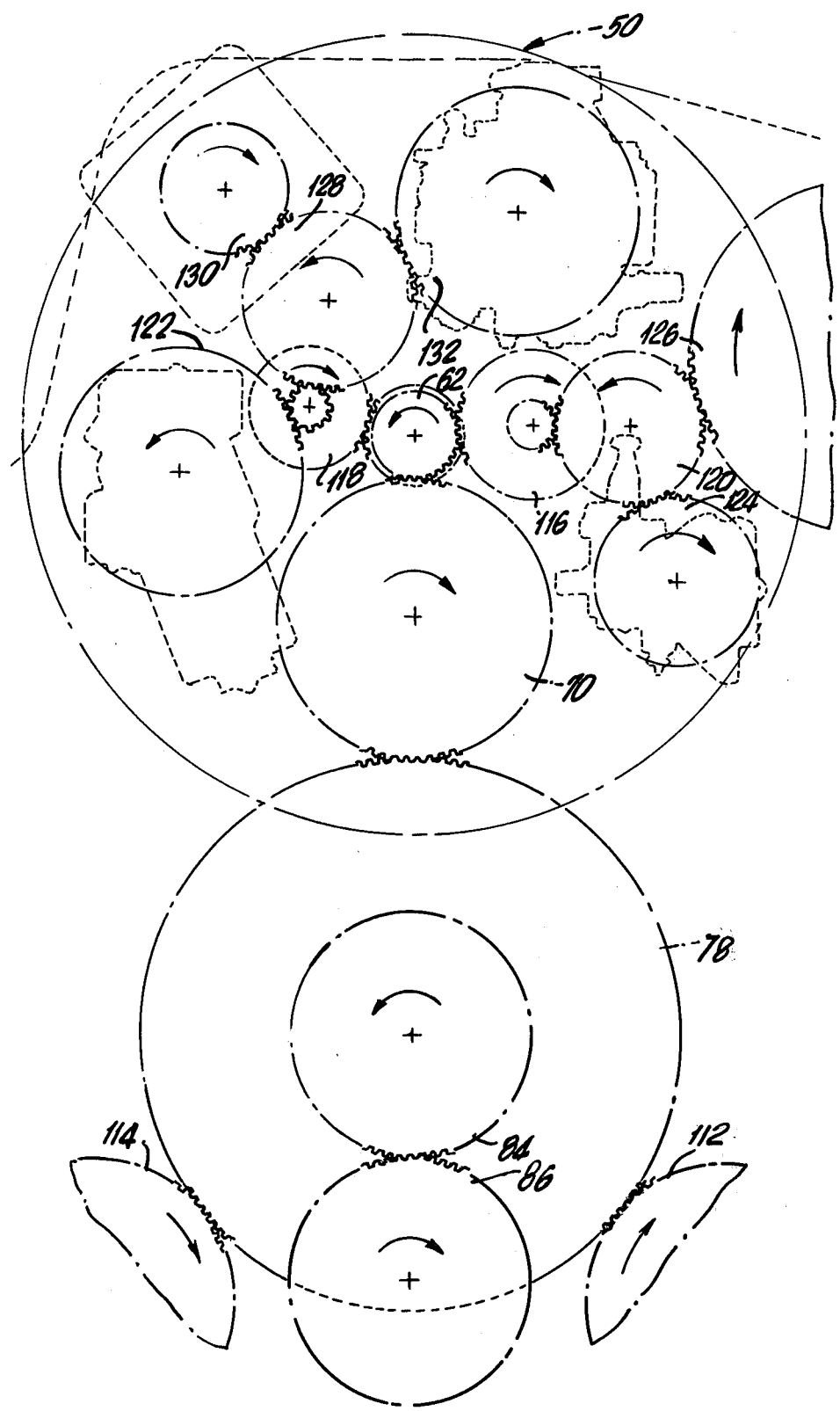
FIG. 6 is a schematic view of the gear train showing the upper engine gearing to the power output means for the gear box according to this invention.

With reference to FIG. 6 the above relationships are better understood due to the schematic end view showing the complete gear train for power section 50. Lower power section drives relate to output gear via similar overrunning clutch output gears 112 and 114 shown in part. The shaft 62 in each power section in addition to driving the clutch connection drives a complete set of accessories via gears 116, 118, 120, 122, 124, 126, 128, 130, 132, etc.

It may thus be realized how this invention provides a combined reduction and accessory gear box receiving the power input from any number of gas turbine engines, three being shown, so as to provide fail-safe power output as by means of a primary drive shaft 18 and a secondary drive shaft 20. Also as the gear box 10 provides each engine with a complete set of accessories and uses a no-back drive connection to the power output from each engine, each engine with the gears associated therewith are totally independent of each other.

With reference again to FIG. 1 this gear box may be said to include a center case 134, a front cover 136 and a rear cover 138. Accordingly, the rear cover 138 and center case 134 divide the gear box 10 into three separate engine compartments, generally outlined in phantom and designated by numerals 48, 50, and 52; and the front cover 136 and center case 134 provide a further fourth compartment, shown by phantom lines 140. Appropriate oil seals between the compartments will segregate such from each other to avoid cross contamination. As will be appreciated by those skilled in the art also secondary cover plates may be used to facilitate machinery, assembly and maintenance.

Accordingly, there is provided a new and improved drive system wherein a single gear box includes three sections, namely, a center case, a rear cover and a front cover. Preferably three engines are mounted on the rear cover in a generally triangular arrangement, and the center case along with the rear cover divides the gear box into three separate compartments. The latter respectively house the accessory drive gears and pads for each engine as well as the first stage reduction gears, the overrunning clutch, and the complete lubrication system for each compartment. The center case also cooperates with the front cover to define a fourth compartment within the gear box, said fourth compartment containing the final reduction gearing consisting of the overrunning clutch that meshes with a single power output gear. In the application of a helicopter drive system, the gear box also includes provision for a secondary drive for a tail rotor assembly. The fourth compartment also includes gears to drive an oil pump for an independent oil system within said compartment. As illustrated in FIG. 3, oil seals are provided on the reduction gear shafts between the three individual compartments 48, 50 and 52 and the fourth compartment 140 (see FIG. 1) to prevent oil from intermixing between compartments. This arrangement prevents contamination of the oil in the adjacent compartments in the event of a failure within a compartment.

Although a particular embodiment of the invention has been described in detail, it is to be understood that the invention is not thus limited but includes modifications and changes which come within the scope of the appended claims.

What is claimed is:

1. A drive system comprising:
   three engines each of which has separate drive means;
   a unitary "y" shaped firewall to separate the engines from each other;
   a gear box to which said engines are mounted with their drive means operatively connected to gear means within said gear box, said firewall being also supported by said gear box to maintain the separation of the engines up to the face of said gear box, said gear box having idler gears operatively connecting the drive means of the three engines to an output drive train of said gear box.

2. The drive system of claim 1 wherein each drive means of said three engines has a one-way clutch means between it and the connection with said idler gears.

3. The drive system of claim 1 wherein the gear box is comprised of three main sections, i.e., a center case, a rear cover and a front cover with means to segregate gearing therein to prevent contamination of one from affecting any other.

4. The drive system of claim 1 wherein the gear means includes a splined shaft for receiving the drive shafts of said three engines, said splined shaft having gear surfaces driving said idler gears and an accessory gear train for each of said three engines.

5. The drive system of claim 4 and further characterized in that said drive train includes a primary shaft and a secondary shaft operatively connected with said primary shaft.

6. In association with a multiple engine a unitary gear box to take the output of the engines and convert same to drive a plurality of separate accessory drives for said engines and a common drive shaft means for all said engines, said gear box comprising:
   a housing for said gear box, said housing having three main sections including a center case, a rear cover and a front cover, said center case being joined with said rear cover to provide separate compartments for segregating the output of the engines, said center case with said front cover providing an additional compartment for the segregated operation of the drive shaft means; and
   a means to drive a separate oil supply for said gear box.

7. The gear box of claim 6 and further characterized by means to prevent cross contamination as between compartments.

8. The gear box of claim 6 wherein the drive shaft means includes a primary drive shaft projecting from said housing and a secondary drive shaft projecting from said housing and driven by said primary drive shaft.

9. The gear box of claim 6 and further including firewall means in combination with said housing to segregate the multiple engines from one another.

10. The structure of claim 9 wherein the multiple engines are three turboshaft engines and said firewall provides a barrier preventing explosive disintegration of one from affecting any other.

* * * * *